(No Model.)
M. C. WOODWARD.
DETACHABLE HANDLE FOR COFFEE POTS.
No. 491,001. Patented Jan. 31, 1893.
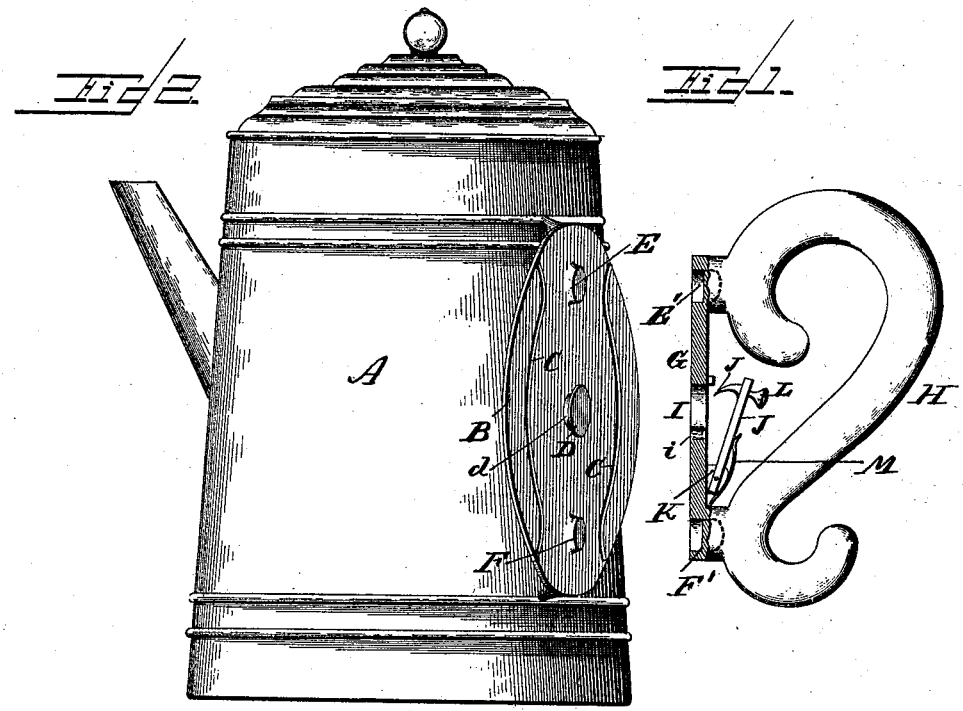
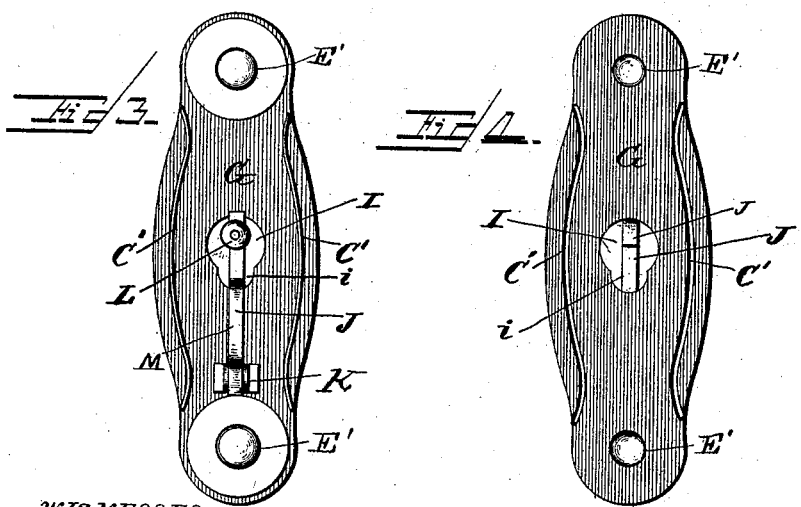
WITNESSES:
INVENTOR:
Mary C. Woodward
Attorneys

UNITED STATES PATENT OFFICE.

MARY C. WOODWARD, OF PONY, MONTANA.

DETACHABLE HANDLE FOR COFFEE-POTS.

SPECIFICATION forming part of Letters Patent No. 491,001, dated January 31, 1893.

Application filed May 12, 1892. Serial No. 432,751. (No model.)

*To all whom it may concern:*

Be it known that I, MARY C. WOODWARD, a citizen of the United States, and a resident of Pony, in the county of Madison and State of Montana, have invented certain new and useful Improvements in Detachable Handles for Coffee-Pots; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view, partly in section, of my improved detachable handle, as it appears in the act of either attaching it to, or removing it from, a coffee pot; Fig. 2 is a perspective view of that part or side of the pot to which the handle is attached, the handle having been removed; Fig. 3 is a plan of the handle-plate, from that side where the handle is fastened to it; and Fig. 4 is a plan of the other side of the handle-plate, viz:, the side which impinges against the side of the pot.

Like letters of reference denote corresponding parts in all the figures.

This invention relates to detachable non-conducting handles for coffee pots, tea pots, or other culinary vessels, and consists in the detailed construction and combination of parts of the handle and its adjuncts as will be hereinafter more fully described and claimed.

Referring to the drawings, the letter A designates the body of a coffee pot, which may be of any approved construction. To that side of the pot to which the handle is to be attached, is securely and permanently fastened an oblong plate B, having curved side flanges or heads C C, a central projecting and circumferentially grooved stud D, and a top and bottom boss, E and F. The handle proper is shown at H, and should be made of wood, or some other light material which is a poor conductor of heat, bent into suitable shape and japanned or varnished. At opposite ends this handle is provided with metallic caps, E' and F', which will fit over and upon the corresponding bosses E and F. These caps are connected by a plate, G, of the same general outline as plate B, over which it fits; said handle-plate G having side-grooves or recesses, C' C', into which, when plate G is placed upon and against plate B, the heads C C of the latter will fit, thus operating to hold the two plates in place upon one another and prevent lateral displacement.

The handle-plate G has an aperture, I, of such size that the grooved stud D of plate B may be easily inserted through it, and this aperture has a downward extension, *i*, of reduced size, so that, by first inserting the stud and then drawing the plate G in an upward direction, this reduced extension will enter and interlock with the groove *d* in the stud, thus serving as a means to fasten the two plates B and G together; and when the two plates are in this position relative to each other, the caps or recessed parts E' and F' will fit upon their corresponding bosses E and F.

As an additional means of fastening, I employ a spring-actuated hook or catch J, one end of which is pivoted in a bearing, K, on plate G, so that its free end will be opposite to the upper end of aperture I. This hook has a wooden knob or handle, L, for operating it, and is provided at its pivoted end with a spring M, operating to depress its free end so as to cause the catch at its upper end to enter the aperture I above stud D (when plates B and G are placed together) and engage, with its curved point *j*, the groove or depression *d* in stud D. In this manner it will be seen that the handle may be secured firmly upon the pot in a moment of time, simply by placing the handle-plate G upon plate B, in the manner described, and snapping hook J into place. The handle may be as easily removed, when desired, simply by unhooking hook J, pushing the handle slightly downward to disengage aperture I *i* from the stud D and at the same time giving plate G a slight tilt so as to disengage it from the studs E and F, when the handle can be easily removed.

Having thus described my invention, I claim and desire to secure by Letters Patent of the United States:

The combination with a coffee pot having plate B provided with the side-beads C, bosses E F, and central grooved stud D, of the detachable handle H having plate G provided with the side channels C' C', end caps E' and F', aperture I $i$ and spring-actuated hook J; all constructed and combined to operate substantially as and for the purpose shown and set forth.

In testimony that I claim the foregoing as my own I have hereunto affixed my signature in presence of two witnesses.

MARY C. WOODWARD.

Witnesses:
ROLAND A. FERGUSON,
HARRY C. DUNCAN.